(12) United States Patent
Kishita

(10) Patent No.: US 10,479,440 B2
(45) Date of Patent: Nov. 19, 2019

(54) ELECTRICALLY POWER ASSISTED BICYCLE

(71) Applicant: YAMAHA HATSUDOKI KABUSHIKI KAISHA, Iwata-shi, Shizuoka (JP)

(72) Inventor: Hirokatsu Kishita, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 114 days.

(21) Appl. No.: 15/704,110

(22) Filed: Sep. 14, 2017

(65) Prior Publication Data

US 2018/0072374 A1 Mar. 15, 2018

(30) Foreign Application Priority Data

Sep. 15, 2016 (JP) .................................. 2016-180399

(51) Int. Cl.
*B62M 6/90* (2010.01)
*B62M 6/45* (2010.01)
*B62M 6/55* (2010.01)

(52) U.S. Cl.
CPC ................ *B62M 6/45* (2013.01); *B62M 6/90* (2013.01); *B62M 6/55* (2013.01)

(58) Field of Classification Search
CPC . B62M 6/45; B62M 6/40; B62M 6/90; B62M 6/55
See application file for complete search history.

(56) References Cited

U.S. PATENT DOCUMENTS

| 6,888,450 | B2* | 5/2005 | Sasaki | B60C 23/006 180/271 |
| 7,096,984 | B2* | 8/2006 | Ono | B60L 53/305 180/65.1 |
| 8,697,266 | B2* | 4/2014 | Muramatsu | H01M 8/04313 429/429 |
| 2005/0035737 | A1 | 2/2005 | Elder et al. | |
| 2011/0056177 | A1* | 3/2011 | Goto | B62M 6/55 56/14.7 |
| 2012/0081080 | A1 | 4/2012 | Aoki et al. | |

(Continued)

FOREIGN PATENT DOCUMENTS

| CN | 1410317 A | 4/2003 |
| CN | 101044039 A | 9/2007 |

(Continued)

*Primary Examiner* — Tony H Winner
(74) *Attorney, Agent, or Firm* — Keating and Bennett, LLP

(57) ABSTRACT

An electrically power assisted bicycle includes an electric motor, a detachable battery that supplies electric power to at least the electric motor, and an operation panel including a controller configured or programmed to control the display in a time display area and a built-in battery that supplies electric power to the controller. When the detachable battery is attached to the electrically power assisted bicycle and the electrically power assisted bicycle is in a power-on state, the controller is supplied with the electric power from the detachable battery. When the electrically power assisted bicycle is turned on from a power-off state in a state where a remaining capacity of the built-in battery is insufficient, the controller displays, in the time display area, information indicating that the remaining capacity of the built-in battery is insufficient.

11 Claims, 10 Drawing Sheets

(56) References Cited

U.S. PATENT DOCUMENTS

| | | | | |
|---|---|---|---|---|
| 2014/0222268 | A1* | 8/2014 | Tsuchizawa | B60L 15/20 |
| | | | | 701/22 |
| 2016/0297499 | A1* | 10/2016 | Ohashi | B62M 6/45 |
| 2017/0029057 | A1* | 2/2017 | Kato | B62M 6/55 |
| 2018/0072373 | A1* | 3/2018 | Kishita | B62M 6/45 |

FOREIGN PATENT DOCUMENTS

| | | | |
|---|---|---|---|
| CN | 102442398 A | 5/2012 | |
| CN | 202294312 U | 7/2012 | |
| CN | 103101447 A | 5/2013 | |
| CN | 205292892 U | 6/2016 | |
| EP | 1 298 050 A1 | 4/2003 | |
| EP | 2 423 033 A2 | 2/2012 | |
| EP | 2 586 686 A1 | 5/2013 | |
| EP | 2 738 080 A1 | 6/2014 | |
| JP | 09-226664 A | 9/1997 | |
| JP | 2012-144107 A | 8/2012 | |
| WO | 2005/110838 A1 | 11/2005 | |
| WO | 2011/069136 A2 | 6/2011 | |
| WO | 2016/083571 A1 | 6/2016 | |
| WO | WO 2016083571 * | 6/2016 | B62J 99/00 |

\* cited by examiner

ELECTRICALLY POWER ASSISTED BICYCLE

CROSS REFERENCE TO RELATED APPLICATIONS

This application claims the benefit of priority to Japanese Patent Application No. 2016-180399 filed on Sep. 15, 2016. The entire contents of this application are hereby incorporated herein by reference.

BACKGROUND OF THE INVENTION

1. Field of the Invention

The present invention relates to an electrically power assisted bicycle including an operation panel that is able to display time.

2. Description of the Related Art

An electrically power assisted bicycle that assists a force of a rider pushing pedals with an electric motor is known (see, for example, Japanese Laid-Open Patent Publication No. 09-226664). Such an electrically power assisted bicycle generates, in an electric motor, a driving force in accordance with human power applied to the pedals by the rider, so as to decrease the load imposed on the rider while, for example, the electrically power assisted bicycle is running on a slope or carrying a load.

An operation panel including a plurality of buttons accepting an input operation made by the rider is provided in the vicinity of a grip of a handle of the electrically power assisted bicycle. There is a type of operation panel that displays time. The time is displayed by using electric power supplied from a battery built in the operation panel. When the power is on, the operation panel may be operated by using electric power supplied from a detachable battery usable to drive the electric motor.

The remaining capacity of the built-in battery in the operation panel is gradually decreased along with the time period of use. When the remaining capacity becomes insufficient, the time is not updated. When, in a state where the remaining capacity of the built-in battery in the operation panel is insufficient, the detachable battery is attached to the electrically power assisted bicycle and the electrically power assisted bicycle is turned on, the operation panel displays reset time (e.g., 12:00). The rider, when checking the reset time, does not understand why the time is reset and may erroneously consider that a malfunction has occurred in the operation panel. There is another problem that a customer service personnel responding to the request for a repair of the electrically power assisted bicycle does not easily determine whether the time is reset because a malfunction has occurred to the operation panel or the time is reset because the remaining capacity of the battery is insufficient. When determining that the time is reset because a malfunction has occurred to the operation panel, the customer service personnel makes a repair by replacing the operation panel with a new operation panel.

SUMMARY OF THE INVENTION

Preferred embodiments of the present invention provide electrically power assisted bicycles that are able to display time on an operation panel and that notify a user that a remaining capacity of a built-in battery in the operation panel is insufficient. An electrically power assisted bicycle according to a preferred embodiment of the present invention includes an electric motor that generates an assist force to assist human power of a rider; a detachable battery that supplies electric power to at least the electric motor; and an operation panel including an operation button that accepts an input operation from the rider, a time display area that displays time, a controller configured or programmed to control a display in the time display area, and a built-in battery that supplies electric power to the controller. In a state where the detachable battery is attached to the electrically power assisted bicycle and the electrically power assisted bicycle is in a power-on state, the controller is configured or programmed to be supplied with the electric power from the detachable battery; and in the case where the electrically power assisted bicycle is turned on from a power-off state in a state where a remaining capacity of the built-in battery is insufficient, the controller is configured or programmed to display, in the time display area, information indicating that the remaining capacity of the built-in battery is insufficient.

In a state where the electrically power assisted bicycle is in the power-off state, the controller is configured or programmed to calculate time by using the electric power supplied from the built-in battery. When the remaining capacity of the built-in battery becomes insufficient, the controller is not able to calculate the time any more. In the case where the electrically power assisted bicycle is turned on from the power-off state in this state and the electric power is supplied from the detachable battery to the controller, the controller displays, in the time display area, the information indicating that the remaining capacity of the built-in battery is insufficient. Thus, the rider recognizes that the remaining capacity of the built-in battery is insufficient. The customer service personnel responding to the request for a repair of the electrically power assisted bicycle also recognizes that the remaining capacity of the built-in battery is insufficient.

If a reset time (e.g., 12:00) is displayed in the case where the electrically power assisted bicycle is turned on in a state where the remaining capacity of the built-in battery is insufficient, the rider does not understand why the time is reset and may erroneously consider that a malfunction has occurred. According to the present preferred embodiment, the reset time is not displayed but information different from the time is displayed, so that the rider and the customer service personnel recognize that the remaining capacity of the built-in battery is insufficient.

In a preferred embodiment of the present invention, in the case where the remaining capacity of the built-in battery becomes insufficient in a state where the detachable battery is attached to the electrically power assisted bicycle and the electrically power assisted bicycle is in the power-off state, and then the electrically power assisted bicycle is turned on from the power-off state, the controller is preferably configured or programmed to display, in the time display area, the information indicating that the remaining capacity of the built-in battery is insufficient.

In a state where the electrically power assisted bicycle is in the power-off state, the controller is configured or programmed to calculate time by using the electric power supplied from the built-in battery. In the case where the remaining capacity of the built-in battery becomes insufficient, the controller does not calculate the time any more. In the case where the electrically power assisted bicycle is turned on from the power-off state in this state and the electric power is supplied from the detachable battery to the controller, the controller is configured or programmed to display, in the time display area, the information indicating that the remaining capacity of the built-in battery is insufficient. Thus, the rider recognizes that the remaining capacity of the built-in battery is insufficient. The customer service personnel responding to the request for a repair of the electrically power assisted bicycle also recognizes that the remaining capacity of the built-in battery is insufficient.

In a preferred embodiment of the present invention, in the case where the remaining capacity of the built-in battery becomes insufficient in a state where the detachable battery is detached from the electrically power assisted bicycle, and then the electrically power assisted bicycle is turned on from the power-off state in a state where the detachable battery is attached to the electrically power assisted bicycle, the controller is preferably configured or programmed to display, in the time display area, the information indicating that the remaining capacity of the built-in battery is insufficient.

In a state where the detachable battery is detached from the electrically power assisted bicycle, the controller is configured or programmed to calculate the time by using the electric power supplied from the built-in battery. In the case where the remaining capacity of the built-in battery becomes insufficient, the controller does not calculate the time any more. In the case where the detachable battery is attached to the electrically power assisted bicycle in this state and the electric power is supplied from the detachable battery to the controller, the controller is configured or programmed to display, in the time display area, the information indicating that the remaining capacity of the built-in battery is insufficient. Thus, the rider recognizes that the remaining capacity of the built-in battery is insufficient. The customer service personnel responding to the request for a repair of the electrically power assisted bicycle also recognizes that the remaining capacity of the built-in battery is insufficient.

In a preferred embodiment of the present invention, the controller is preferably configured or programmed to display, in the time display area, information including a predefined particular symbol, as the information indicating that the remaining capacity of the built-in battery is insufficient.

As the information indicating that the remaining capacity of the built-in battery is insufficient, information including a predefined particular symbol is displayed. Thus, the rider and the customer service personnel recognize that the remaining capacity of the built-in battery is insufficient.

In a preferred embodiment of the present invention, the particular symbol may be a hyphen.

As the information indicating that the remaining capacity of the built-in battery is insufficient, information including a hyphen is displayed. Thus, the rider and the customer service personnel recognize that the remaining capacity of the built-in battery is insufficient.

In a preferred embodiment of the present invention, the time display area preferably includes a plurality of display areas each including seven segments, for example, and displays time by using the plurality of display areas; and the plurality of display areas preferably each display any of the numerical figures 0 through 9 by using the seven segments, and display one hyphen by using one of the seven segments.

When the time is displayed by using the plurality of display areas each including seven segments, information including a hyphen is displayed as the information indicating that the remaining capacity of the built-in battery is insufficient. Thus, the rider and the customer service personnel recognize that the remaining capacity of the built-in battery is insufficient.

In a preferred embodiment of the present invention, the controller is preferably configured or programmed to display, with blinking, the information indicating that the remaining capacity of the built-in battery is insufficient in the time display area.

The information indicating that the remaining capacity of the built-in battery is insufficient is displayed in a blinking mode so that the rider and the customer service personnel recognize, more certainly, that the remaining capacity of the built-in battery is insufficient.

In a preferred embodiment of the present invention, the controller is preferably configured or programmed to display, in the time display area for a predetermined time period, the information indicating that the remaining capacity of the built-in battery is insufficient, and then preferably turns off the display of the information indicating that the remaining capacity of the built-in battery is insufficient.

Some riders of the electrically power assisted bicycle may not require the time display function of the operation panel. The display of the information indicating that the remaining capacity of the built-in battery is insufficient is turned off after a predetermined time period, so that such riders may drive the electrically power assisted bicycle without caring that the remaining capacity of the built-in battery is insufficient.

In a preferred embodiment of the present invention, in the case where the electrically power assisted bicycle is turned off from the power-on state, the controller is preferably operated in a sleep mode. In the sleep mode, the controller is preferably configured or programmed to calculate time. In the case where the electrically power assisted bicycle is turned on from the power-off state and the controller is activated from the sleep mode, the controller is preferably configured or programmed to display time in the time display area.

The time is calculated in the sleep mode so that the current time is displayed in the time display area when the controller is activated.

In a preferred embodiment of the present invention, in a state where the detachable battery is detached from the electrically power assisted bicycle, the controller is preferably operated in the sleep mode by using the electric power supplied from the built-in battery.

Even in a state where the detachable battery is detached from the electrically power assisted bicycle, the controller is configured or programmed to calculate the time by using the electric power supplied from the built-in battery.

In a preferred embodiment of the present invention, in the case where the remaining capacity of the built-in battery becomes insufficient in a state where the electrically power assisted bicycle is in the power-off state, the controller is preferably shut down. In the case where the electrically power assisted bicycle is turned on from the power-off state in a state where the detachable battery is attached to the electrically power assisted bicycle, and then the controller is activated from the shut-down state, the controller is preferably configured or programmed to display, in the time display area, the information indicating that the remaining capacity of the built-in battery is insufficient.

In the case where the remaining capacity of the built-in battery becomes insufficient, the controller is preferably shut down. The activation of the controller from the shut-down state indicates that the remaining capacity of the built-in battery is insufficient. In the case where the controller is activated from the shut-down state, the controller is configured or programmed to display, in the time display area, the information indicating that the remaining capacity of the built-in battery is insufficient. In this manner, when the remaining capacity of the built-in battery is insufficient, the information indicating so is displayed.

If a method of measuring the voltage of the built-in battery to determine whether or not the remaining capacity of the built-in battery is insufficient is used, the measured value is varied among products in the voltage measuring circuit. This makes it difficult to set a threshold value by which it is determined whether or not the remaining capacity of the built-in battery is insufficient, and decreases the determination precision on whether or not the remaining capacity of the built-in battery is insufficient. This method may be achieved at low cost by using software to determine, in the case where the controller is activated from the sleep mode, that the remaining capacity of the built-in battery is insufficient. In this case, the determination precision on whether or not the remaining capacity of the built-in battery is insufficient is high.

In a state where the electrically power assisted bicycle is in the power-off state, the controller is configured or programmed to calculate time by using the electric power supplied from the built-in battery. When the remaining capacity of the built-in battery becomes insufficient, the controller is not able to calculate the time any more. In the case where the electrically power assisted bicycle is turned on from the power-off state in this state and the electric power is supplied from the detachable battery to the controller, the controller is configured or programmed to display, in the time display area, the information indicating that the remaining capacity of the built-in battery is insufficient. Thus, the rider recognizes that the remaining capacity of the built-in battery is insufficient. The customer service personnel responding to the request for a repair of the electrically power assisted bicycle also recognizes that the remaining capacity of the built-in battery is insufficient.

If a reset time (e.g., 12:00) is displayed in the case where the electrically power assisted bicycle is turned on in a state where the remaining capacity of the built-in battery is insufficient, the rider does not understand why the time is reset and may erroneously consider that a malfunction has occurred. According to a preferred embodiment of the present invention, the reset time is not displayed but information indicating that the remaining capacity of the built-in battery is insufficient, for example, information different from the time, is displayed. Thus, the rider and the customer service personnel recognize that the remaining capacity of the built-in battery is insufficient.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, electrically power assisted bicycles according to preferred embodiments of the present invention will be described with reference to the drawings. In the following preferred embodiments, like components will have like reference signs, and the same descriptions will not be repeated. In the preferred embodiments of the present invention, the terms "front", "rear", "left", "right", "up" and "down" respectively refer to front, rear, left, right, up and down in a state where a rider of an electrically power assisted bicycle sits on a saddle (seat) thereof while facing a handle thereof.

In the following description, an electrically power assisted bicycle including a child seat that allows a child to sit thereon will be described as an example. In the following description, the term "rider" does not refer to the child who is on the electrically power assisted bicycle, but refers to a person operating the bicycle. It is not required that a child is on the electrically power assisted bicycle. Preferred embodiments of the present invention are applicable to an electrically power assisted bicycle not including the child seat. The following preferred embodiments are illustrative, and the present invention is not limited to the following preferred embodiments.

Figure 1:
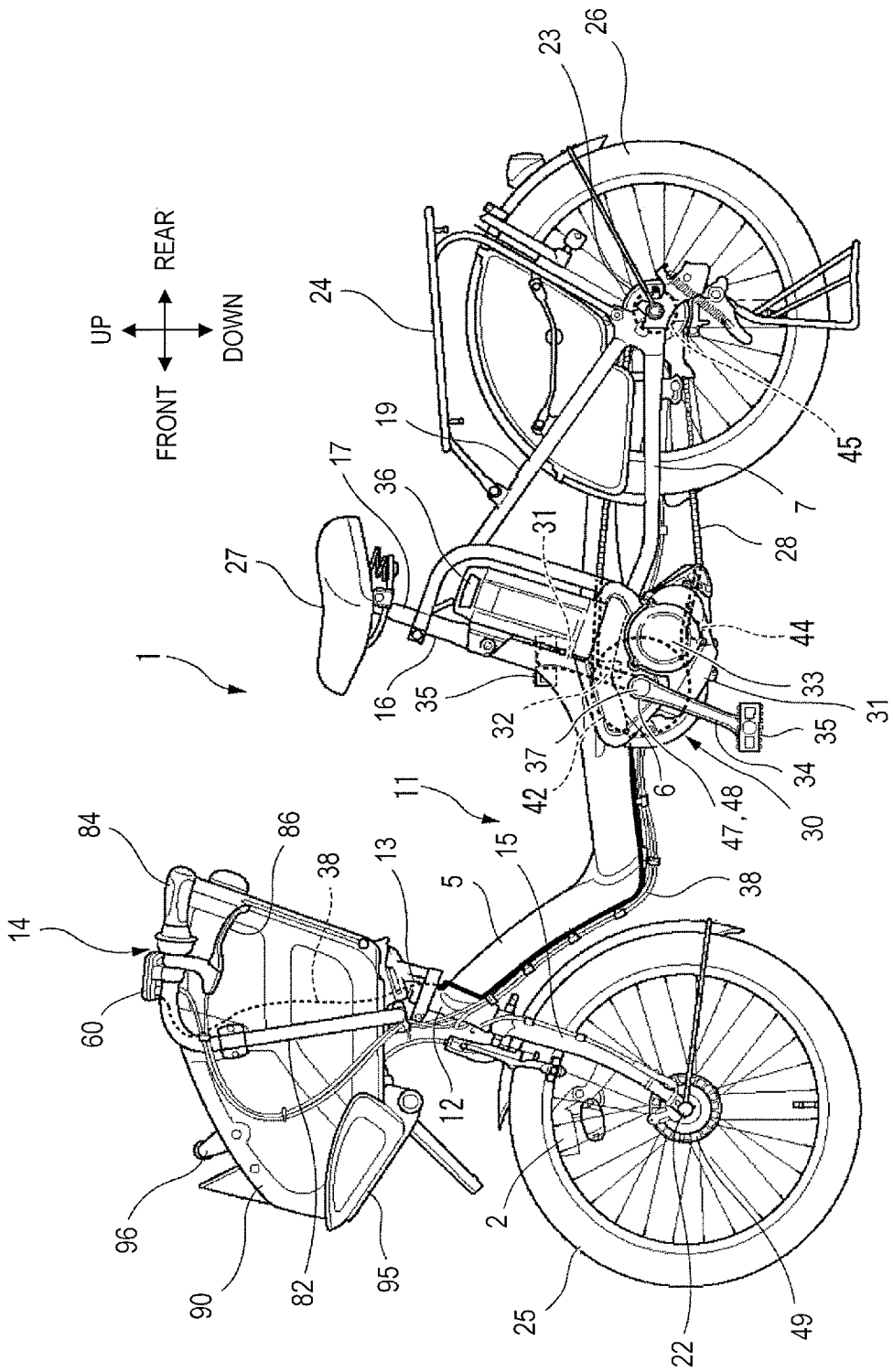
FIG. 1 is a side view of an electrically power assisted bicycle according to a preferred embodiment of the present invention.

FIG. 1 is a side view of an electrically power assisted bicycle 1 according to a preferred embodiment of the present invention. FIG. 1 shows a two-wheel electrically power assisted bicycle as a non-limiting example of the electrically power assisted bicycle 1.

The electrically power assisted bicycle 1 includes a vehicle frame 11 extending in a front-rear direction. The vehicle frame 11 includes a head pipe 12, a down tube 5, a bracket 6, a chain stay 7, a seat tube 16, and a seat stay 19. The head pipe 12 is located at a front end of the vehicle frame 11. The handle stem 13 is rotatably inserted into the head pipe 12. A handle 14 is secured to a top portion of the handle stem 13. A front fork 15 is secured to a bottom portion of the handle stem 13. At a bottom end of the front fork 15, a front wheel 25, which is a steered wheel, is rotatably supported via an axle 22. At the bottom end of the front fork 15, a front wheel rotation sensor 49 that detects the rotation of the front wheel 25 is provided. To the side of the front wheel 25, a headlight 2 is located. The headlight 2 is attached to the front fork 15.

The handle 14 is provided with a child seat 90 such that the child seat 90 is pivotable together with the handle 14. When the rider pivots the handle 14 to operate the handle 14, the child seat 90 is pivoted together with the handle 14.

The down tube 5 extends obliquely downward and rearward from the head pipe 12. The seat tube 16 extends upward from a rear end of the down tube 16. The chain stay 7 extends rearward from a bottom end of the seat tube 16. The bracket 6 connects a rear end of the down tube 5, the bottom end of the seat tube 16 and a front end of the chain stay 7 to each other.

A seat post 17 is inserted into the seat tube 16. A saddle 27, on which the rider sits, is provided at a top end of the seat post 17. A rear end of the chain stay 7 rotatably supports a rear wheel 26, which is a driving wheel. The seat stay 19 extends obliquely rearward and downward from a top portion of the seat tube 16. A bottom end of the seat stay 19 is connected with a rear portion of the chain stay 7. The seat stay 19 supports a rack 24 provided to the rear of the saddle 27.

A drive unit 30 is attached to the bracket 6 located at, or in the vicinity of, a vehicle center of the vehicle frame 11. The drive unit 30 includes a control device 32, an electric motor 33, crank arms 34, pedals 35, a crankshaft 37, a drive sprocket 42, an assist sprocket 44, a torque sensor 47, and a crank sensor 48. These components included in the drive unit 30 are incorporated into a unit case 31. A driven sprocket 45 is provided coaxially with a driving shaft 23 of the rear wheel 26. A detachable battery 36 that supplies electric power to the electric motor 33 and the like is mounted on the bracket 6. The detachable battery 36 may be supported by the seat tube 16. The detachable battery 36 is attachable to, and detachable from, the electrically power assisted bicycle 1. In a state where the detachable battery 36 is detached from the electrically power assisted bicycle 1, the detachable battery 36 is connected with an external charger (not shown) to be charged.

The crankshaft 37 is supported by extending through the drive unit 30 in a left-right direction. At both of two ends of the crankshaft 37, the crank arms 34 are provided. At a tip of each of the crank arms 34, the pedal 35 is rotatably provided. Human power (pressing force) applied by the rider to the pedals 35 is detected by the torque sensor 47 as a torque generated in the crankshaft 37. The crank sensor 48 detects the rotation of the crankshaft 37.

The control device 32 controls various operations of the electrically power assisted bicycle 1. A rotation output of the crankshaft 37 generated when the rider presses and rotates the pedals 35 is transmitted to the rear wheel 26 via the drive sprocket 42, a chain 28 and the driven sprocket 45. The control device 32 is configured or programmed to control the electric motor 33 such that the electric motor 33 generates a driving assist output in accordance with the rotation output of the crankshaft 37. The driving assist output from the electric motor 33 is transmitted to the rear wheel 26 via the assist sprocket 44, the chain 28 and the driven sprocket 45. Instead of the chain 28, a belt, a shaft or the like may be used. With the electrically power assisted bicycle 1, the electric motor 33 generates an assist power that assists the human power of the rider, so that the load on the rider is decreased when, for example, the electrically power assisted bicycle 1 is running on a slope or carrying a load.

The handle 14 is provided with an operation panel 60. The rider operates the operation panel 60 to switch on or off the electrically power assisted bicycle 1 or sets the magnitude of the assist power of the electric motor 33. The operation panel 60 transmits or receives information to or from the control device 32 via a line 38.

Figure 2:
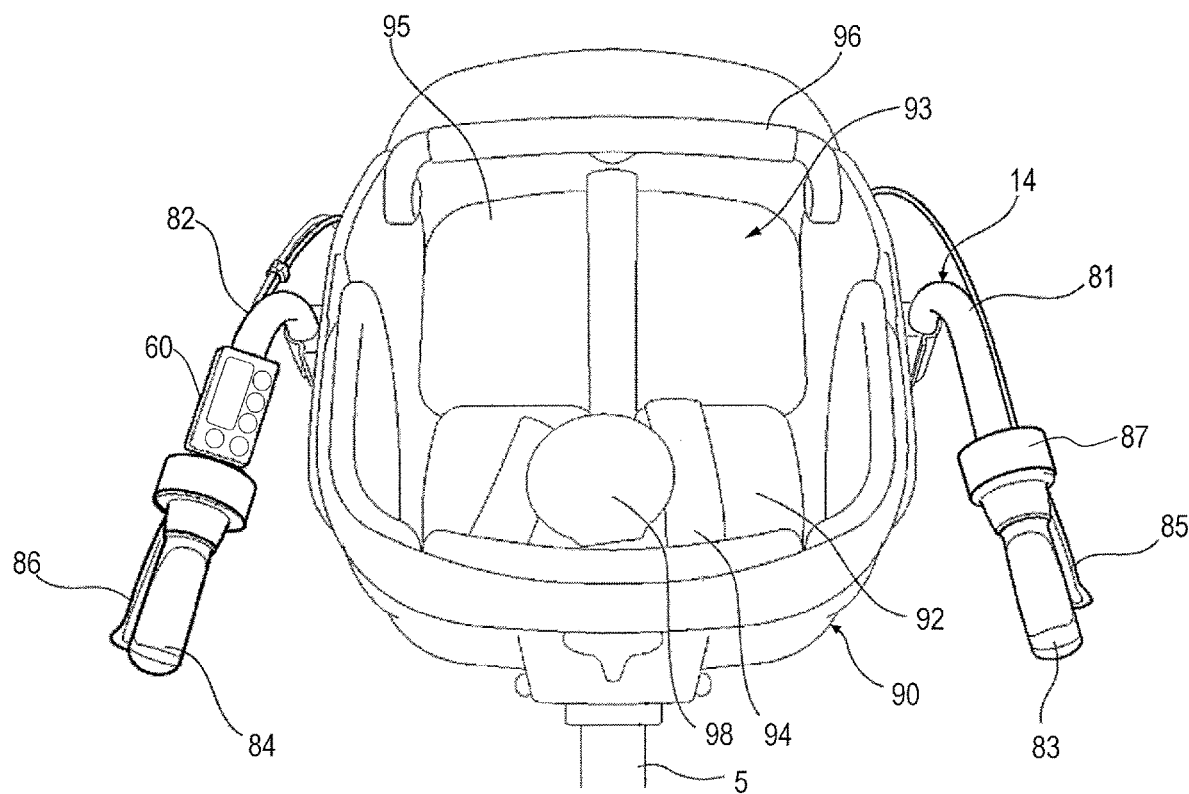
FIG. 2 is an isometric view showing a front portion of the electrically power assisted bicycle in a preferred embodiment of the present invention.

FIG. 2 is an isometric view showing a front portion of the electrically power assisted bicycle 1. The handle 14 includes a right handle bar 81 and a left handle bar 82. At a rear end of the right handle bar 81, a right grip 83 is provided. At a rear end of the left handle bar 82, a left grip 84 is provided. The rider steers the electrically power assisted bicycle 1 while gripping the right grip 83 and the left grip 84.

A front wheel brake lever 85 is provided in the vicinity of the right grip 83. A rear wheel brake lever 86 is provided in the vicinity of the left grip 84. When the rider grips the right grip 83 and also the front wheel brake lever 85 with his/her right hand, a braking force is provided to the front wheel 25. When the rider grips the left grip 84 and also the rear wheel brake lever 86 with his/her left hand, a braking force is provided to the rear wheel 26.

A gear shifter 87 usable by the rider to switch the gear ratio is provided in the vicinity of the right grip 83 provided on the right handle bar 81. The operation panel 60 is provided in the vicinity of the left grip 84 provided on the left handle bar 82.

The handle 14 supports the child seat 90, in which a child may sit. The child seat 90 is located between the right handle bar 81 and the left handle bar 82. The child seat 90 has a concaved shape with a top opening. The child seat 90 includes a sitting portion 92, at a bottom surface thereof, on which a child may sit. The child seat 90 includes a through-hole 93, allowing the legs of a child to be inserted, to the front of the sitting portion 92. Below the through-hole 93, a footrest 95 is provided. The child seat 90 includes a seat belt 94 that holds the body of the child while the child is sitting. The seat belt 94 includes a buckle 98 that fastens or loosens the seat belt 94. A bar 96 that is able to be gripped by a child is provided at a position forward and upward with respect to the sitting portion 92.

Figure 3:
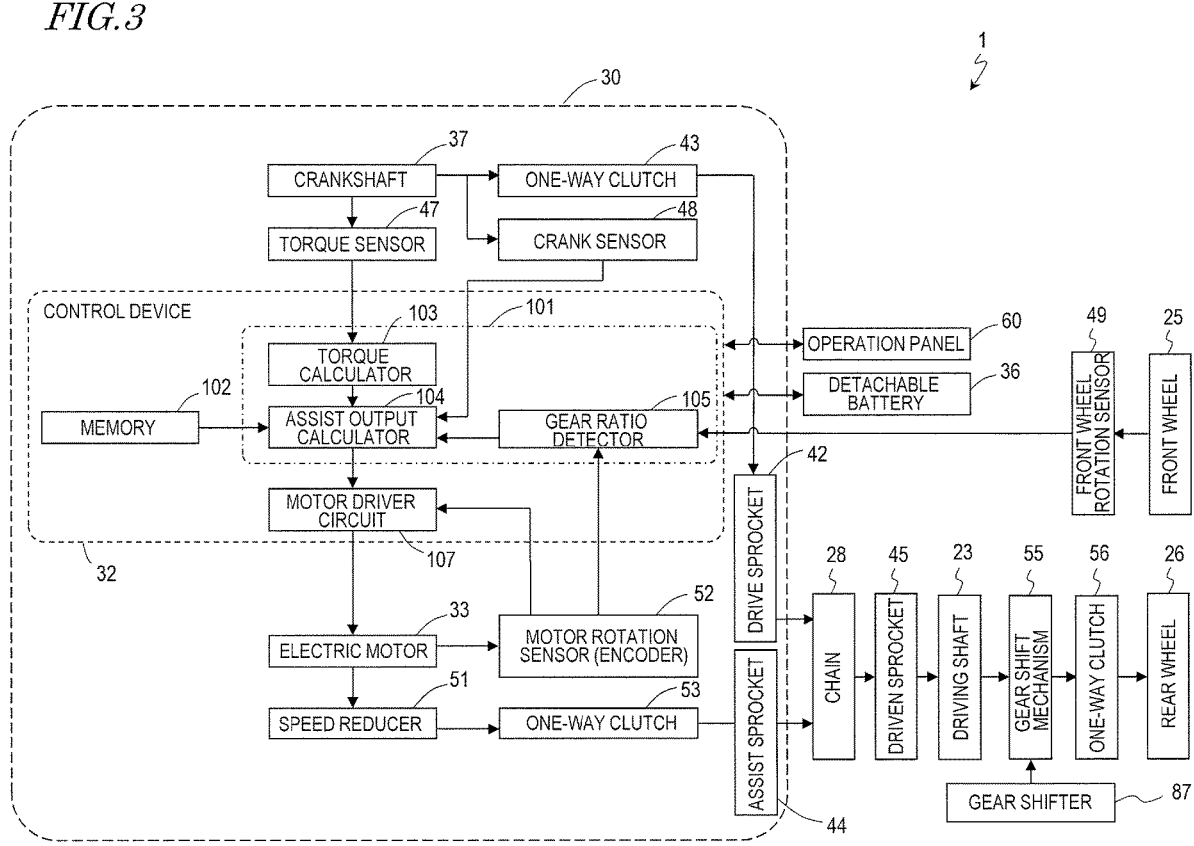
FIG. 3 is a block diagram showing a mechanical and electrical structure of the electrically power assisted bicycle in a preferred embodiment of the present invention.

FIG. 3 is a block diagram showing a mechanical and electric structure of the electrically power assisted bicycle 1. The drive unit 30 includes the crankshaft 37, the torque sensor 47, a one-way clutch 43, the crank sensor 48, the drive sprocket 42, the control device 32, the electric motor 33, a motor rotation sensor 52, a speed reducer 51, a one-way clutch 53, and the assist sprocket 44. The drive unit 30 is an assist output control system that causes the electric motor 33 to generate a driving assist output in accordance with human power of the rider applied to the pedals 35.

First, a transmission route of mechanical power will be described. When the rider presses the pedals 35 to rotate the crankshaft 37, the rotation of the crankshaft 37 is transmitted to the chain 28 via the one-way clutch 43 and the drive sprocket 42. The one-way clutch 43 transmits only a forward rotation of the crankshaft 37 to the drive sprocket 42, but does not transmit a reverse rotation of the crankshaft 37 to the drive sprocket 42. The rotation of the electric motor 33 is transmitted to the chain 28 via the speed reducer 51, the one-way clutch 51 and the assist sprocket 44. The one-way clutch 51 transmits, to the assist sprocket 44, only a rotation of the electric motor 33 in such a direction as to rotate the chain 28 in a forward direction, but does not transmit, to the assist sprocket 44, a rotation of the electric motor 33 in such a direction as to rotate the chain 28 in a reverse direction. The crank rotation output generated by the human power applied by the rider to the pedals 35 and the driving assist output generated by the electric motor 33 are combined by the chain 28. The human power and the assist force generated by the electric motor 33 may be combined at the chain 28 or combined at a mechanism that rotates about the same rotation axis as the crankshaft 37.

The rotation of the chain 28 is transmitted to the driving shaft 23 via the driven sprocket 45. The rotation of the driving shaft 28 is transmitted to the rear wheel 26 via a gear shift mechanism 55 and a one-way clutch 56.

The gear shift mechanism 55 changes the gear ratio in accordance with the input operation made by the rider on the gear shifter 87. The one-way clutch 56 transmits the rotation of the driving shaft 23 to the rear wheel 26 only when the rotation rate of the driving shaft 23 is higher than the rotation rate of the rear wheel 26. When the rotation rate of the driving shaft 23 is lower than the rotation rate of the rear wheel 26, the one-way clutch 56 does not transmit the rotation of the driving shaft 23 to the rear wheel 26.

Now, driving control performed by the control device 32 on the electric motor 33 will be described. The control device 32 is, for example, an MCU (Motor Control Unit). Thus, the control device 32 is also referred to as a "control unit". The control device 32 includes a controller 101, a memory 102, and a motor driver circuit 107. The controller 101 controls the operation of the electric motor 33 and also controls the operation of the components of the electrically power assisted bicycle 1. The memory 102 has stored therein, for example, a computer program that defines a procedure that controls the electric motor 33 and the components of the electrically power assisted bicycle 1. The controller 101 reads the computer program from the memory 102 to execute various controls. The area enclosed by the one-dot chain line in FIG. 3 shows a functional block of the controller 101. The controller 101 is configured or programmed to function as a torque calculator 103, an assist output calculator 104, and a gear ratio detector 105.

The human power (pressing power) applied by the rider on the pedals 35 is detected by the torque sensor 47 as a torque generated in the crankshaft 37. The torque sensor 47 outputs a voltage signal in accordance with the detected torque to the torque calculator 103. The torque calculator 103 converts the voltage signal from the torque sensor 47 into a torque. For example, the torque calculator 103 converts an analog voltage signal input from the torque sensor 47 into a digital voltage signal, and calculates the torque based on the level of the digital voltage signal. The torque calculator 103 outputs the calculated torque to the assist output calculator 104.

The crank sensor 48 detects a rotation angle of the crankshaft 37. The crank sensor 48 outputs a signal in accordance with the rotation angle of the crankshaft 37 to the assist output calculator 104. For example, the crank sensor 48 detects the rotation of the crankshaft 37 at an interval of a predetermined angle and outputs a square wave signal or a sine wave signal. The assist output calculator 104 calculates a rotation rate of the crankshaft 37 based on the output signal from the crank sensor 48. The assist output calculator 104 multiples the rotation rate of the crankshaft 37 by the torque calculated by the torque calculator 103 to calculate a crank rotation output.

The electric motor 33 is provided with the motor rotation sensor 52. The motor rotation sensor 52 is, for example, an encoder. The motor rotation sensor 52 detects a rotation angle of a rotor of the electric motor 33 and outputs a signal in accordance with the rotation angle to the gear ratio detector 105 and the motor driver circuit 107. For example, the motor rotation sensor 52 detects the rotation of the rotor at an interval of a predetermined angle and outputs a square wave signal or a sine wave signal. The gear ratio detector 105 and the motor driver circuit 107 calculate a rotation rate of the electric motor 33 based on the output signal from the motor rotation sensor 52.

The front wheel rotation sensor 49 detects a rotation angle of the front wheel 25 and outputs a signal in accordance with the rotation angle to the gear ratio detector 105. For example, the front wheel rotation sensor 49 detects the rotation of the front wheel 25 at an interval of a predetermined angle and outputs a square wave signal or a sine wave signal. The gear ratio detector 105 calculates a rotation rate of the front wheel 25 based on the output signal from the front wheel rotation sensor 49. The gear ratio detector 105 calculates a gear ratio based on the rotation rate of the electric motor 33 and the rotation rate of the front wheel 25, and outputs the calculated gear ratio to the assist output calculator 104.

The assist output calculator 104 calculates a command value to cause the electric motor 33 that generates an appropriate driving assist output based on the outputs from the torque calculator 103, the crank sensor 48 and the gear ratio detector 105, a button operation made by the rider on the operation panel 60, information stored in the memory 102, or the like. Then, the assist output calculator 104 outputs the command value to the motor driver circuit 107. The assist output calculator 104, for example, refers to a map created based on, for example, the relationship between the crank rotation output generated by the human power of the rider applied to the pedals 35 and the driving assist output generated by the electric motor 33 to calculate the command value. In the memory 102, a plurality of types of maps are stored. The assist output calculator 104 reads a map suitable to corresponding certain conditions from the memory 102 and refers to the read map to calculate the command value.

The motor driver circuit 107 is, for example, an inverter, and supplies electric power in accordance with the command value from the assist output calculator 104 to the electric motor 33 via the detachable battery 36. When supplied with the electric power, the electric motor 33 is rotated to generate a predetermined driving assist output. In this manner, the assist output calculator 104 allows the electric motor 33 that generates a driving assist output to assist the motion of the rider pressing the pedals 35 while the electrically power assisted bicycle 1 is running.

Now, the operation panel 60 will be described in detail.

Figure 4:
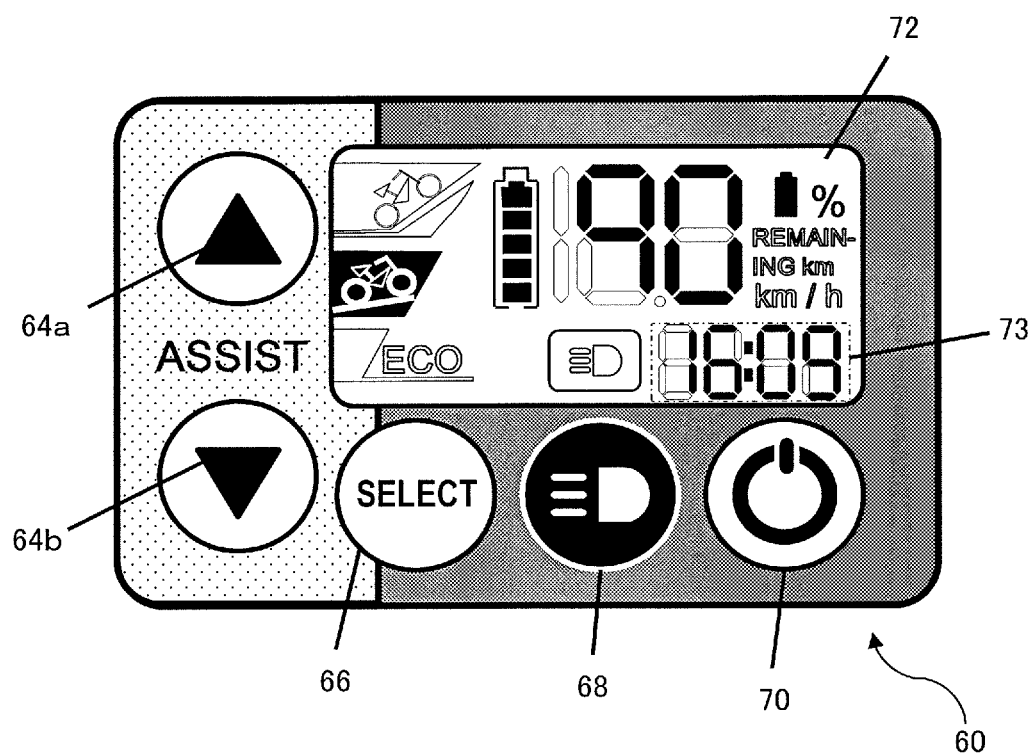
FIG. 4 is an external view of an operation panel in a preferred embodiment of the present invention.

FIG. 4 is an external view of the operation panel 60. The operation panel 60 includes a plurality of buttons 64a, 64b, 66, 68 and 70 that accept an input operation made by the rider and also includes a liquid crystal panel 72. The plurality of buttons include, specifically, assist force setting buttons 64a and 64b, a switch button 66, a headlight button 68, and a power button 70, for example.

The assist force setting buttons 64a and 64b set an assist force of the electric motor 33 or a running mode corresponding to the magnitude of the assist force. The "assist force" of the electric motor 33 is a force that assists the human power. In this example, four running modes are provided for the electrically power assisted bicycle 1. The four running modes are, for example, an assist-free mode, an ecological mode, a standard mode and a strong mode, in the order from the mode in which the magnitude of assistance to human power is weakest. In the assist-free mode, the electric motor 33 does not generate any assist force.

When the rider presses the assist force setting button 64a in the assist-free mode, the assist-free mode is changed to the ecological mode. When the rider presses the assist force setting button 64a in the ecological mode, the ecological mode is changed to the standard mode. When the rider presses the assist force setting button 64a in the standard mode, the standard mode is changed to the strong mode. Even if the rider presses the assist force setting button 64a in the strong mode, the strong mode is maintained and is not changed any more. By contrast, when the assist force setting button 64b is pressed in this state, the strong mode is changed to the standard mode as described below.

The assist force setting button 64b is pressed to select a running mode that provides a weaker assist force, opposite to the assist force setting button 64a. When the rider presses the assist force setting button 64b in the strong mode, the strong mode is changed to the standard mode. When the rider presses the assist force setting button 64b in the standard mode, the standard mode is changed to the ecological mode. When the rider presses the assist force setting button 64b in the ecological mode, the ecological mode is changed to the assist-free mode. Even if the rider presses the assist force setting button 64b in the assist-free mode, the assist-free mode is maintained and is not changed. When the rider presses the assist force setting button 64a in this state, the assist-free mode is changed to the ecological mode.

In the example shown in FIG. 4, a running mode display area is provided in a left portion of a display screen of the liquid crystal panel 72. In the example shown in FIG. 4, the standard mode at the center is highlighted to show that the standard mode is now selected.

The switch button 66 is used by the rider to switch the display on the liquid crystal panel 72. In the present preferred embodiment, the liquid crystal panel 72 is able to display the remaining capacity of the detachable battery 36, the remaining distance by which assisted running is possible, and the current running speed. Each time the rider presses the switch button 66, the display on the liquid crystal panel 72 is sequentially switched to the remaining capacity of the detachable battery 36, to the remaining distance by which assisted running is possible, and to the current running speed. In the example shown in FIG. 4, such information is displayed in an upper right portion of the display screen of the liquid crystal panel 72. In FIG. 4, the remaining capacity of the detachable battery 36 is displayed as "90%", for example. The other items, specifically, "remaining km" and "km/h", respectively represent the remaining distance by which assisted running is possible and the current running speed.

In a time display area 73 in a lower right portion of the display screen of the liquid crystal panel 72, time is displayed. In FIG. 4, time "16:09" is displayed. In the present preferred embodiment, a microcomputer included in the operation panel 60 calculates the time and displays the time in the time display area 73.

The headlight button 68 is used to alternately switch on or off the headlight 2. The power button 70 is used to turn on or off the electrically power assisted bicycle 1. When the electrically power assisted bicycle 1 is in a power-on state, the drive unit 30 is operable. When the electrically power assisted bicycle 1 is in a power-off state, the drive unit 30 is not operable.

In the present preferred embodiment, the liquid crystal panel 72 displays letters, symbols, icons and the like using a segment system. This is merely illustrative. The liquid crystal panel 72 may display letters, symbols, icons and the like in a display area using a dot matrix system, or display a moving image. The liquid crystal panel 72 is shown as an example of a display of the operation panel 60. Alternatively, a display other than the liquid crystal panel, for example, an organic EL panel or an electronic paper may be used.

Figure 5:
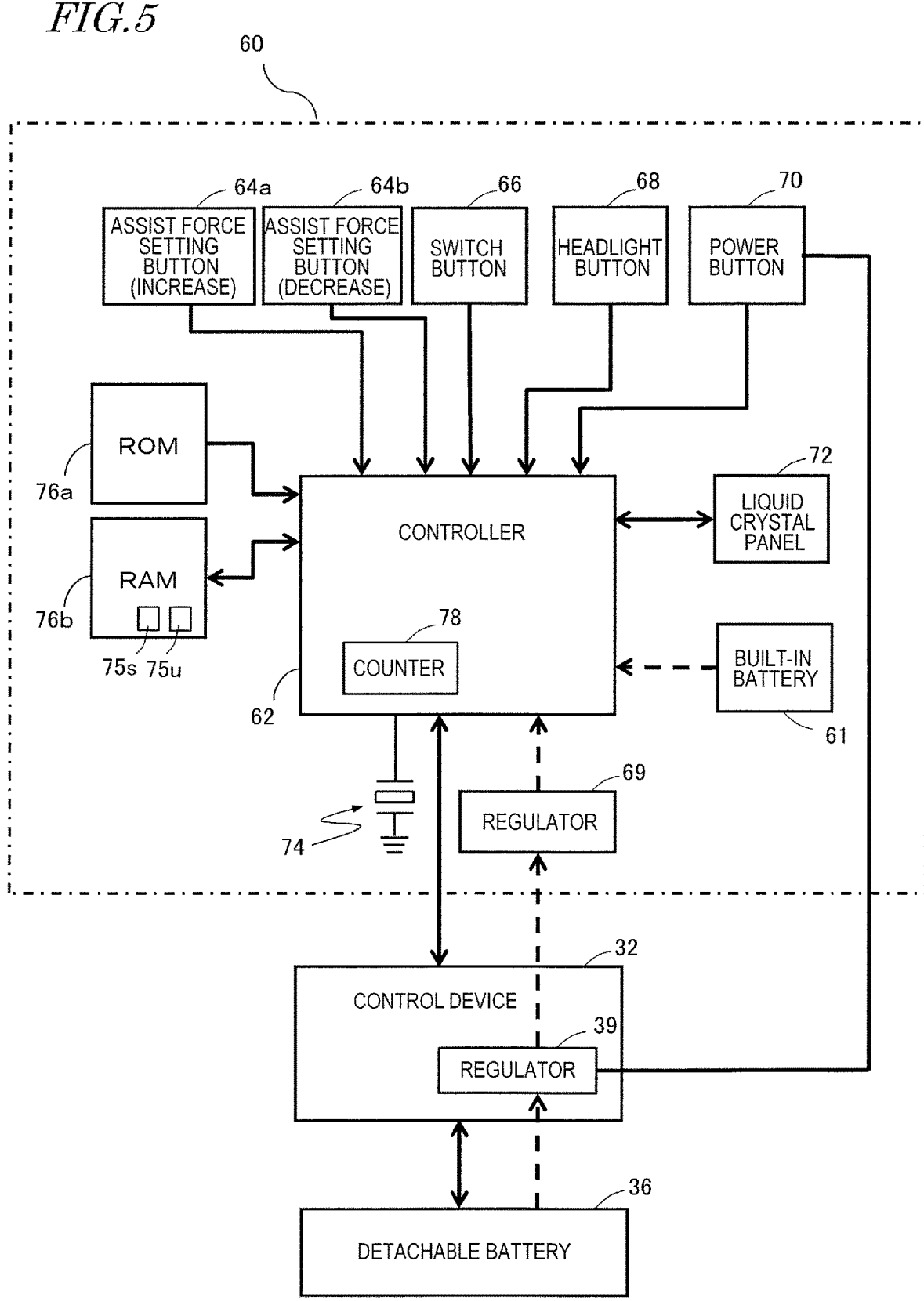
FIG. 5 shows a hardware structure of the operation panel in a preferred embodiment of the present invention.

FIG. 5 shows a hardware structure of the operation panel 60. In addition to the buttons and the like shown in FIG. 4, the operation panel 60 includes a built-in battery 61, a controller 62, a regulator 69, an oscillator 74 made of quartz or silicon, a ROM 76a, and a RAM 76b.

The controller 62 is preferably a microcontroller or a control circuit configured or programmed to control the operation of the operation panel 60, and is, for example, a semiconductor circuit. In a state where the detachable battery 36 is attached to the electrically power assisted bicycle 1 and the electrically power assisted bicycle 1 is in the power-on state, the controller 62 is powered by the electric power supplied from the detachable battery 36. In a state where the electrically power assisted bicycle 1 is in the power-on state, the controller 62 may be powered by the electric power of the built-in battery 61. The built-in battery 61 is, for example, a primary cell such as, for example, a button cell or the like. The built-in battery 61 may be a secondary cell, which is chargeable. In FIG. 5, the electric power supplied from the detachable battery 36 or the built-in battery 61 to the controller 62 is represented by the dashed line.

The control device 32 in the drive unit 30 (FIG. 1) includes a regulator 39 (FIG. 5). The power button 70 is connected with the control device 32 via the line 38 (FIG. 1). When the rider presses the power button 70 while the electrically power assisted bicycle 1 is in the power-off state, the regulator 39 starts to operate. For example, when the power button 70 is pressed, a portion of the circuit in the control device 32 becomes conductive with the ground, and the regulator 39 starts operating using the conductive contact as a trigger. The regulator 39 decreases the output voltage of the detachable battery 36 (e.g., about 24 V) to the operating voltage of the control device 32 (e.g., about 12 V). The decreased voltage is supplied to the regulator 69 in the operation panel 60 via the line 38 (FIG. 1). The regulator 69 decreases the input voltage to the operating voltage of the controller 62 (e.g., about 5.0 V) and supplies the decreased voltage to the controller 62. The controller 62 is supplied with the electric power from the regulator 69 and is activated. Instead of the regulators 39 and 69, a DC/DC converter may be used.

The controller 62 supplied with the electric power from the regulator 69 reads a computer program stored in the ROM 76a and executes the computer program in the RAM 76b to execute various processes on the operation panel 60. The ROM 76a and the RAM 76b may be incorporated into the controller 62.

The microcomputer 62 is connected with the plurality of buttons 64a, 64b, 66, 68 and 70 to detect that the respective buttons have been pressed. The buttons may be pressed in the manner of a "short press" and a "long press". The controller 62 detects a "short press" and a "long press". For example, when the rider starts pressing a button, the controller 62 detects a voltage value and/or a current value of a predetermined level or higher. When the rider finishes pressing the button, the controller 62 detects that the voltage value and/or the current value that has been detected is now, for example, insufficient. The controller 62 determines whether the press was a short press or a long press based on the time period from the detection of the voltage value and/or the current value until the detection of the voltage value and/or the current value becoming insufficient. The controller 62 may detect a short press or a long press of a plurality of buttons at the same time.

The controller 62 calculates the time and displays the time in the time display area 73 of the liquid crystal panel 72. The controller 62 uses a counter 78 to calculate the time. The controller 62 uses a clock signal supplied from the oscillator 74, or a frequency-divided signal obtained as a result of the frequency of the clock signal being divided, to count up the value of the counter 78. The controller 62 converts the count value to actual time. The method for finding the time by using the oscillator is known and thus will not be described herein in detail.

When the electrically power assisted bicycle 1 is turned off from the power-on state, the drive unit 30 stops operating, but the controller 62 is put into a sleep mode to continue operating. In the sleep mode, the controller 62 is operated by using the electric power supplied from the built-in battery 61. In order to significantly reduce or minimize the power consumption, the controller 62 performs a minimum possible amount of operations on the operation panel 60 in the sleep mode. The "minimum possible amount of operation" is, for example, the calculation of time or the like. The calculation of time is continued even in the sleep mode, so that when the electrically power assisted bicycle 1 is turned on from the power-off state and the controller 62 is activated from the sleep mode, the controller 62 may display the current time in the time display area 73.

In the sleep mode, the controller 62 is powered by the electric power supplied from the built-in battery 61. Therefore, the controller 62 is operated in the sleep mode even if not provided with the electric power from the detachable battery 36. Even in a state where the detachable battery 36 is detached from the electrically power assisted bicycle 1, the controller 62 is operated in the sleep mode.

The remaining capacity of the built-in battery 61 is gradually decreased in accordance with the time period of use. When the remaining capacity becomes insufficient, the controller 62 does not update the time. The expression that "the remaining capacity of the built-in battery 61 becomes insufficient" indicates that the output voltage of the built-in battery 61 is decreased down to a level where the controller 62 is not guaranteed to perform an operation of calculating the time. For example, in the case where the built-in battery 61 is a button cell having a nominal voltage of 3.0 V and the minimum operating voltage of the controller 62 is 1.8 V, a state where the output voltage of the button cell is less than 1.8 V is considered as a state where the remaining capacity of the built-in battery 61 is insufficient. These voltage values are illustrative, and preferred embodiments of the present invention are not limited to these voltage values.

In the present preferred embodiment, in the case where the electrically power assisted bicycle 1 is turned on from the power-off state in a state where the remaining capacity of the built-in battery 61 is insufficient, and the controller 62 is supplied with the electric power from the detachable battery 36, the controller 62 displays, in the time display area 73, information indicating that the remaining capacity of the built-in battery 61 is insufficient. Thus, the rider recognizes that the remaining capacity of the built-in battery 61 is insufficient. The customer service personnel responding to the request for a repair of the electrically power assisted bicycle 1 also recognizes that remaining capacity of the built-in battery 61 is insufficient.

Figure 6A:
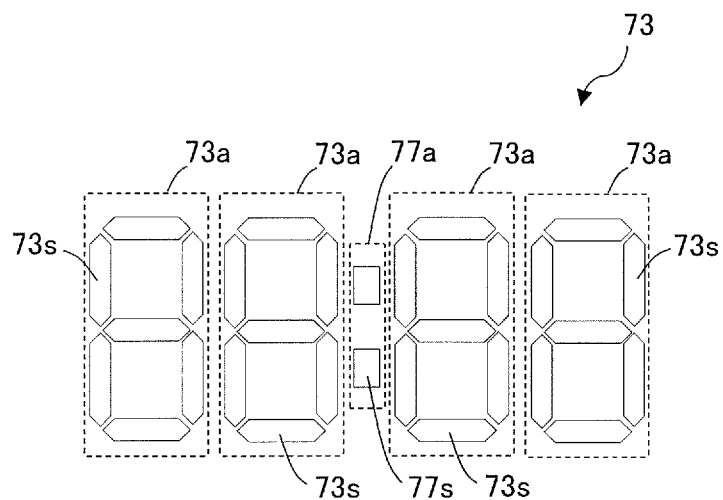
FIG. 6A shows a time display area of a liquid crystal panel in a preferred embodiment of the present invention.
Figure 6B:
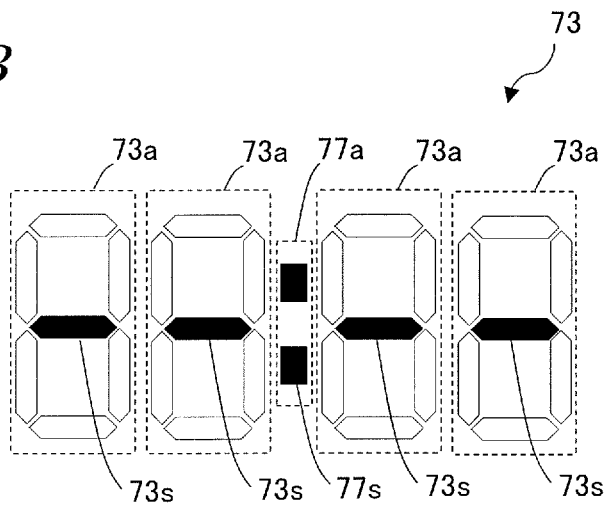
FIG. 6B shows the time display area displaying information indicating that a remaining capacity of a built-in battery is insufficient in a preferred embodiment of the present invention.

As shown in FIG. 4, the liquid crystal panel 72 in the operation panel 60 includes the time display area 73 displaying the time. FIG. 6A shows the time display area 73 of the liquid crystal panel 72. FIG. 6B shows the time display area 73 displaying the information that the remaining capacity of the built-in battery 61 is insufficient.

In the present preferred embodiment, numerals or numerical figures 0 through 9 are displayed preferably using seven segments, for example. The time display area 73 includes four display areas 73a and one display area 77a. The four display areas 73a each include seven segments 73s. The four display areas 73a each display any of the numerical figures 0 through 9 using the seven segments 73s. The method of displaying the numerical figures using the seven segments 73s is known and thus will not be described herein in detail.

The display area 77a includes two segments 77s. The display area 77a displays a colon ":" by using the two segments 77s. The time display area 73 displays time by a combination of the displayed numerical figures and the colon.

In the case where the electrically power assisted bicycle 1 is turned on from the power-off state in a state where the remaining capacity of the built-in battery 61 is insufficient, and the controller 62 is supplied with the electric power from the detachable battery 36, the controller 62 displays, in the time display area 73, the information indicating that the remaining capacity of the built-in battery 61 is insufficient. For example, as shown in FIG. 6B, the controller 62 displays a predefined particular symbol in the time display area 73 as the information indicating that the remaining capacity of the built-in battery 61 is insufficient. In the example shown in FIG. 6B, a hyphen and a colon are displayed in the time display area 73 as the predefined particular symbol. One of the seven segments 73s in the display area 73a is turned on and the remaining segments are turned off, so that a hyphen is displayed in the display area 73a. In the example shown in FIG. 6B, the four display areas 73a each display a hyphen. As the information indicating that the remaining capacity of the built-in battery 61 is insufficient, predefined information is displayed. Thus, the rider and the customer service personnel recognize that the remaining capacity of the built-in battery 61 is insufficient.

Figure 7:
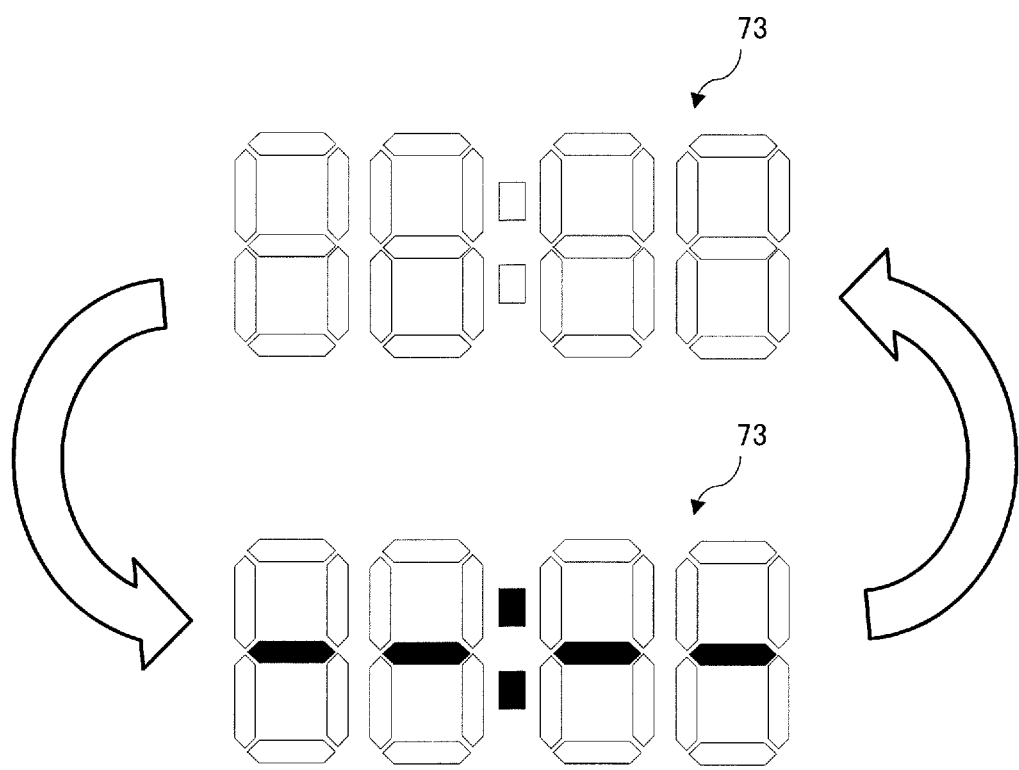
FIG. 7 shows the time display area displaying, with blinking, the information indicating that the remaining capacity of the built-in battery is insufficient in a preferred embodiment of the present invention.

The information indicating that the remaining capacity of the built-in battery 61 is insufficient may be displayed in a blinking mode, in the time display area 73. FIG. 7 shows the time display area 73 displaying in a blinking mode, the information indicating that the remaining capacity of the built-in battery 61 is insufficient. The controller 62 switches, every predetermined time period, the display state of the time display area 73 between a non-display state and a state of displaying four hyphens to display, with blinking, the information indicating that the remaining capacity of the built-in battery 61 is insufficient. With such blinking, the rider and the customer service personnel recognize, with more certainty, that the remaining capacity of the built-in battery 61 is insufficient.

Figure 8:
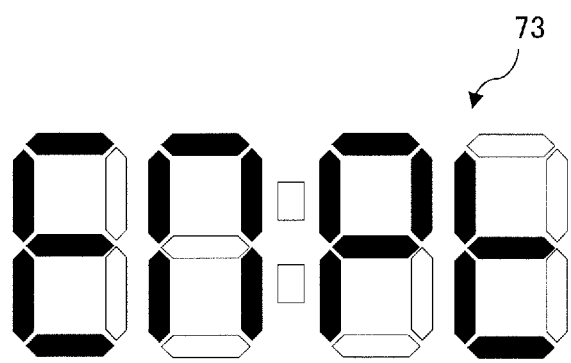
FIG. 8 shows another example of information indicating that the remaining capacity of the built-in battery is insufficient in a preferred embodiment of the present invention.

In the above description, hyphens are displayed as the information indicating that the remaining capacity of the built-in battery 61 is insufficient. Display of the hyphens is illustrative. The information indicating that the remaining capacity of the built-in battery 61 is insufficient is not limited to hyphens, and may be provided in any other manner. For example, alphabetical letters may be displayed. FIG. 8 shows the time display area 73 displaying letters. In the example shown in FIG. 8, the time display area 73 displays "Empt", which represents "empty", as the information indicating that the remaining capacity of the built-in battery 61 is insufficient. Alternatively, letters and numerical figures may be displayed in combination. Predefined information is displayed as the information indicating that the remaining capacity of the built-in battery 61 is insufficient, so that the rider and the customer service personnel recognize that remaining capacity of the built-in battery 61 is insufficient.

Figure 9:
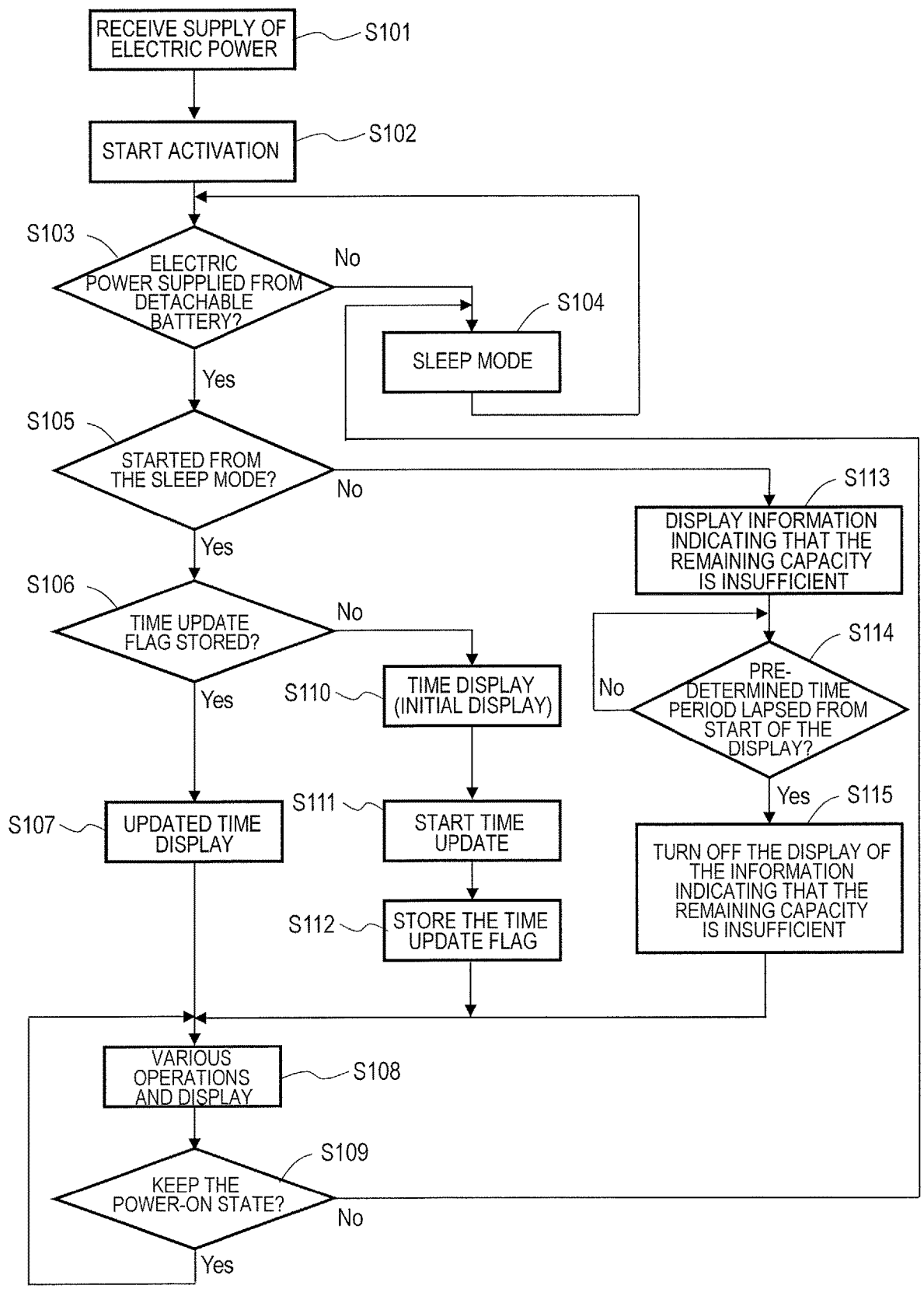
FIG. 9 is a flowchart showing an operation procedure of a controller configured or programmed to control the display in the time display area in a preferred embodiment of the present invention.

Hereinafter, an operation procedure of the controller 62 of controlling the display in the time display area 73 will be described in detail. FIG. 9 is a flowchart showing the operation procedure of the controller 62 of controlling the display in the time display area 73.

First, an operation of attaching the built-in battery 61 in the operation panel 60 will be described. The expression "attachment of the built-in battery 61" refers to that in a state where no built-in the built-in battery 61 is provided in the operation panel 60, for example, immediately after the production of the operation panel 60, the built-in battery 61 is placed into the operation panel 60. The expression "attachment of the built-in battery 61" also refers to the built-in battery 61 being replaced with a new built-in battery 61 when the remaining capacity of the former built-in battery 61 becomes insufficient.

Figure 10A:
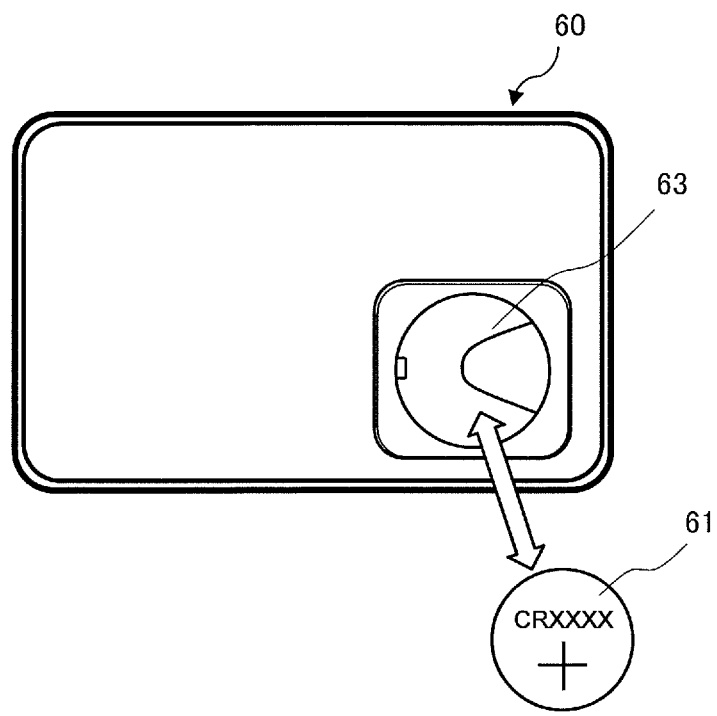
FIG. 10A and FIG. 10B each show the operation panel including a battery box in a preferred embodiment of the present invention.
Figure 10B:
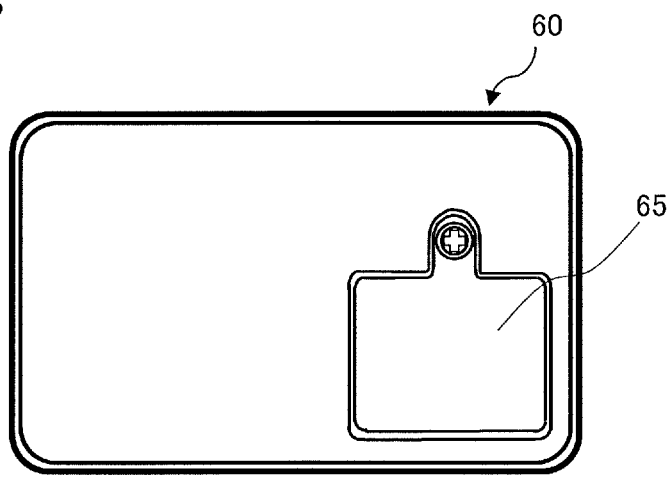

The built-in battery 61 is attached inside the operation panel 60. In the case where it is difficult for the user to attach the built-in battery 61, for example, in the case where the housing of the operation panel 60 needs to be disassembled in order to attach the built-in battery 61, the built-in battery 61 may be attached by an assembly or maintenance worker. In the case where it is easy for the user to attach the built-in battery 61, the user may attach the built-in battery 61. FIG. 10 shows the operation panel 60 including a battery box, which allows the user to attach the built-in battery 61 easily. FIG. 10 shows a rear surface of the operation panel 60 that is opposite to an operation surface. FIG. 10A shows a battery box 63 included in the operation panel 60, and FIG. 10B shows a cover 65 covering the battery box 63. In the example shown in FIG. 10, the cover 65 is secured to the housing of the operation panel 60 with a screw. The user disengages the screw and detaches the cover 65 so as to access the battery box 63. In the example shown in FIG. 10, the built-in battery 61 is a button cell. The built-in battery 61 is placed into the battery box 63, and the cover 65 is attached to the housing of the operation panel 60. Thus, the attachment work is finished.

Referring to FIG. 9, when the built-in battery 61 is attached to the operation panel 60, electric power is supplied to the controller 62 from the built-in battery 61 (step S101). When supplied with the electric power from the built-in battery 61, the controller 62 starts an activation operation (step S102). In step S102, the controller 62 does not start calculating the time. In step S102, the RAM 76b does not have a time update flag 75u described below stored therein.

Alternatively, the controller 62 may start calculating the time in step S102. However, in step S102, the display of the liquid crystal panel 72 is in an off state. Therefore, even if the calculation of the time is started, the time is not displayed.

The controller 62 determines whether or not there is a supply of electric power from the detachable battery 36 (step S103). Whether or not there is a supply of electric power from the detachable battery 36 may be determined based on whether or not there is a supply of electric power to a terminal of the controller 62 that is connected with the regulator 69. Immediately after the built-in battery 61 is attached to the operation panel 60, there is no input operation made on the power button 70. Therefore, the regulator 39 is not in operation. Since there is no supply of electric power from the detachable battery 36, the controller 62 is put into the sleep mode (step S104). When put into the sleep mode, the controller 62 stores a sleep mode flag 75s, which indicates that the controller 62 is in the sleep mode, in the RAM 76b.

Unless the power button 70 is pressed to turn the controller 62 on (No in step S103), the controller 62 is maintained in the sleep mode.

When the power button 70 is pressed and the electric power is supplied from the detachable battery 36 to the controller 62, the controller 62 is activated and transferred from the sleep mode to a normal operation mode. At the same time, the drive unit 30 is activated.

When activated, the controller 62 determines whether or not the activation is from the sleep mode (step S105). When the activation is from the sleep mode, the RAM 76b has the sleep mode flag 75s stored therein. When determining that the RAM 76b has the sleep mode flag 75s stored therein, the controller 62 advances the procedure to step S106. In step S106, the controller 62 determines whether or not the RAM 76b has the time update flag 75u stored therein. The time update flag 75u will be described below. In the case where the controller 62 is activated after the built-in battery 61 is attached to the operation panel 60, the RAM 76b does not hold the time update flag 75u stored therein. Thus, the controller 62 advances the procedure to step S110.

In step S110, an initial time display is performed. The controller 62 displays, for example, the time 12:00 in the time display area 73 as the initial time display. After the initial time display, the controller 62 starts updating the time to be displayed and stores the time update flag 75u, which indicates that the time is being updated, in the RAM 76b (step S111 and step S112). While the electric power is continued to be supplied from at least one of the detachable battery 36 and the built-in battery 61 to the controller 62, the time update flag 75u is maintained in the RAM 76b. Then, the controller 62 executes controls on various operations and display of the operation panel 60 in the normal operation mode (step S108). In the normal operation mode, the controller 62 controls operations in accordance with an input operation made by the rider to each of the buttons 64a, 64b, 66, 68 and 70 and controls the display on the liquid crystal panel 72. In this step, when the rider makes an input operation to set the time to be displayed to the current time, the controller 62 displays the time in accordance with the set time.

While the electrically power assisted bicycle 1 is in the power-on state, the controller 62 is kept in the normal operation mode (Yes step S109). When the rider presses the power button 70 to turn the electrically power assisted bicycle 1 off, the operation of the regulator 39 (FIG. 5) is stopped, and the drive unit 30 is turned off. At the same time, the supply of the electric power from the detachable battery 36 to the controller 62 is stopped. When the supply of the electric power from the detachable battery 36 is stopped, the controller 62 is transferred from the normal operation mode to the sleep mode, in which the controller 62 is operated by using the electric power from the built-in battery 61 (No in step S109). In the sleep mode, the controller 62 turns off the display of the liquid crystal panel 73 and does not accept any input operation on the assist force setting buttons 64a and 64b, the switch button 66 or the headlight button 68.

When put into the sleep mode in step S104, the controller 62 stores the sleep mode flag 75s in the RAM 76b. Alternatively, in the case where the sleep mode flag 75s is already stored in the RAM 76b, the controller 62 keeps holding the sleep mode flag 75s. The controller 62 keeps holding the time update flag 75u stored in the RAM 76b. In the sleep mode, the controller 62 keeps on calculating the time by using the electric power supplied from the built-in battery 61.

Unless the power button 70 is pressed to turn the electrically power assisted bicycle 1 on (No in step S103), the controller 62 is maintained in the sleep mode.

When the power button 70 is pressed and the electric power is supplied from the detachable battery 36 to the controller 62, the controller 62 is activated and transferred from the sleep mode to the normal operation mode. At the same time, the drive unit 30 is activated.

When activated, the controller 62 determines whether or not the activation is from the sleep mode (step S105). When determining that the RAM 76*b* has the sleep mode flag 75*s* stored therein, the controller 62 advances the procedure to step S106. In step S106, the controller 62 determines whether or not the RAM 76*b* has the time update flag 75*u* stored therein. In the case where the controller 62 is activated after being transferred from the normal operation mode to the sleep mode, the RAM 76*b* has the time update flag 75*u* stored therein. When determining that the RAM 76*b* has the time update flag 75*u* stored therein, the controller 62 advances the procedure to step S107. In the sleep mode, the controller 62 keeps calculating the time in the sleep mode. Therefore, when the electrically power assisted bicycle 1 is turned on from the power-off state and the controller 62 is activated from the sleep mode, the controller 62 displays the updated time in the time display area 73. Then, the controller 62 advances the procedure to step S108.

In step S108, the controller 62 executes controls on various operations and display of the operation panel 60 in the normal operation mode.

While the electrically power assisted bicycle 1 is in the power-on state, the controller 62 is maintained in the normal operation mode (Yes step S109). When the rider presses the power button 70 to turn the electrically power assisted bicycle 1 off, the operation of the regulator 39 (FIG. 5) is stopped, and the drive unit 30 is turned off. At the same time, the supply of the electric power from the detachable battery 36 to the controller 62 is stopped. When the supply of the electric power from the detachable battery 36 is stopped, the controller 62 is transferred from the normal operation mode to the sleep mode (No in step S109).

In the sleep mode, the controller 62 keeps calculating the time by using the electric power supplied from the built-in battery 61. In the sleep mode, the RAM 76*b* keeps holding the sleep mode flag 75*s* and the time update flag 75*u*.

When the power button 70 is pressed and the electric power is supplied from the detachable battery 36 to the controller 62, the controller 62 is activated from the sleep mode to the normal operation mode. At the same time, the drive unit 30 is activated. While the remaining capacity of the built-in battery 61 is not insufficient, such an operation is repeated.

Now, an operation of the controller 62 in the case where the remaining capacity of the built-in battery 61 becomes insufficient will be described.

In the sleep mode, the controller 62 is operated by using the electric power supplied from the built-in battery 61. When the remaining capacity of the built-in battery 62 becomes insufficient in the sleep mode, the controller 62 is not operable anymore and is shut down. The expression "shut down" refers to that the operation of the controller 62 is completely stopped. For example, when the electrically power assisted bicycle 1 is turned off, the electric power is not supplied from the detachable battery 36 to the controller 62. When the remaining capacity of the built-in battery 62 becomes insufficient in this state, the controller 62 is not supplied with the electric power from any component and thus is shut down.

There may be a configuration of the electrically power assisted bicycle 1 in which even if the electrically power assisted bicycle 1 is turned off, the electric power is kept supplied from the detachable battery 36 to the controller 62 as long as the detachable battery 36 is kept attached to the electrically power assisted bicycle 1. Even in such a configuration, when the remaining capacity of the built-in battery 62 becomes insufficient in a state where the detachable battery 36 is detached from the controller 62, the controller 62 is not supplied with the electric power from any component and thus is shut down. When the remaining capacity of the built-in battery 62 becomes insufficient in a state where the detachable battery 36 is detached from the electrically power assisted bicycle 1 or in a state where the remaining capacity of the detachable battery 36 is insufficient, the controller 62 is not supplied with the electric power from any component and thus is shut down.

The RAM 76*b*, which is a volatile memory, does not hold data stored therein when the electric power is not supplied thereto. When the electric power is not supplied to the controller 62 or the RAM 76*b* from any component, the controller 62 is shut down and the sleep mode flag 75*s* and the time update flag 75*u* stored in the RAM 76*b* are deleted.

When the rider presses the power button 70 in a state where the detachable battery 36 is attached to the electrically power assisted bicycle 1, the regulator 39 (FIG. 5) starts operating. The electric power is supplied from the detachable battery 36 to the controller 62, so that the controller 62 is activated from the shut-down state (step S101 and step S102).

The controller 62 determines whether or not there is a supply of electric power from the detachable battery 36 (step S103). In the case where the controller 62 is activated after being shut down because the remaining capacity of the built-in battery 61 is insufficient, there is a supply of electric power from the detachable battery 36 to the controller 62. Therefore, the controller 62 advances the procedure to step S105.

In step S105, the controller 62 determines whether or not the activation is from the sleep mode. At the time of the shut-down of the controller 62, the sleep mode flag 75*s* and the time update flag 75*u* stored in the RAM 76*b* were deleted. Therefore, the RAM 76*b* does not have the sleep mode flag 75*s* stored therein. When it is determined that the RAM 76*b* does not have the sleep mode flag 75*s* stored therein, the controller 62 advances the procedure to step S113. In step S113, the controller 62 displays, in the time display area 73, information indicating that the remaining capacity of the built-in battery 61 is insufficient. The time display area 73 provides the display shown in, for example, FIG. 6, FIG. 7 or FIG. 8.

After displaying the information indicating that the remaining capacity of the built-in battery 61 is insufficient for a predetermined time period in the time display area 73, the controller 62 turns off the display of the information indicating that the remaining capacity of the built-in battery 61 is insufficient (step S114 and step S115). For example, after displaying the information indicating that the remaining capacity of the built-in battery 61 is insufficient for five seconds in the time display area 73, the controller 62 turns off the display. Some riders of the electrically power assisted bicycle 1 may not require the time display function of the operation panel 60. The display of the information indicating that the remaining capacity of the built-in battery 61 is insufficient is turned off after a predetermined time period. Therefore, such riders may drive the electrically power assisted bicycle 1 without caring that the remaining capacity of the built-in battery 61 is insufficient. In the case where the information indicating that the remaining capacity of the built-in battery 61 is insufficient is to be kept displayed in the time display area 73, steps S114 and S115 may be omitted.

Then, the controller 62 executes controls on various operations and display of the operation panel 60 in the normal operation mode (step S108).

While the electrically power assisted bicycle 1 is in the power-on state, the controller 62 is maintained in the normal operation mode (Yes step S109). When the rider presses the power button 70 to turn the electrically power assisted bicycle 1 off, the operation of the regulator 39 (FIG. 5) is stopped, and the drive unit 30 is turned off. At the same time, the supply of the electric power from the detachable battery 36 to the controller 62 is stopped. In a state where the remaining capacity of the built-in battery 61 is insufficient, the controller 62 is shut down when the supply of the power from the detachable battery 36 is stopped.

While there is no supply of electric power from the built-in battery 61, the controller 62 performs the operation described above as an operation that is performed when the controller 62 is activated from the shut-down state. When the built-in battery 62 having no remaining capacity is replaced with a new built-in battery 62, the controller 62 performs the operation described above as an operation that is performed when the built-in battery 61 is attached to the operation panel 60.

As described above, while the electrically power assisted bicycle 1 is the power-off state, the controller 62 calculates the time by using the electric power supplied from the built-in battery 61. When the remaining capacity of the built-in battery 61 becomes insufficient, the controller 62 cannot calculate the time any more. When, for example, the electrically power assisted bicycle 1 is turned on from the power-off state and the electric power is supplied from the detachable battery 36 to the controller 62, the controller 62 displays, in the time display area 73, the information indicating that remaining capacity of the built-in battery 61 is insufficient. Thus, the rider recognizes that the remaining capacity of the built-in battery 61 is insufficient. The customer service personnel responding to the request for the repair of the electrically power assisted bicycle 1 also recognizes that the remaining capacity of the built-in battery 61 is insufficient.

In the above described preferred embodiments, a two-wheel electrically power assisted bicycle is described as an example of the electrically power assisted bicycle. The present invention is not limited to this. For example, the electrically power assisted bicycle may have three or more wheels.

In the above described preferred embodiments, the driving wheel to which human power generated by the rider pressing the pedals and the assist power generated by the electric motor are transmitted is the rear wheel. The present invention is not limited to this. Depending on the configuration of the electrically power assisted bicycle, human power and the assist power may be transmitted to the front wheel or both of the front wheel and the rear wheel.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An electrically power assisted bicycle comprising:
    an electric motor that generates an assist force to assist human power of a rider;
    a detachable battery that supplies electric power to at least the electric motor; and
    an operation panel including an operation button that accepts an input operation from the rider, a time display area that displays time, a controller configured or programmed to control a display in the time display area, and a built-in battery that supplies electric power to the controller; wherein
    the controller is supplied with the electric power from the detachable battery when the detachable battery is attached to the electrically power assisted bicycle and the electrically power assisted bicycle is in a power-on state; and
    the controller is configured or programmed to display, in the time display area, information indicating that a remaining capacity of the built-in battery is insufficient when the electrically power assisted bicycle is turned on from a power-off state in a state in which the remaining capacity of the built-in battery is insufficient.

2. The electrically power assisted bicycle according to claim 1, wherein, when the remaining capacity of the built-in battery becomes insufficient in a state where the detachable battery is attached to the electrically power assisted bicycle and the electrically power assisted bicycle is in the power-off state, and then the electrically power assisted bicycle is turned on from the power-off state, the controller is configured or programmed to display, in the time display area, the information indicating that the remaining capacity of the built-in battery is insufficient.

3. The electrically power assisted bicycle according to claim 1, wherein, when the remaining capacity of the built-in battery becomes insufficient in a state where the detachable battery is detached from the electrically power assisted bicycle, and then the electrically power assisted bicycle is turned on from the power-off state in which the detachable battery is attached to the electrically power assisted bicycle, the controller is configured or programmed to display, in the time display area, the information indicating that the remaining capacity of the built-in battery is insufficient.

4. The electrically power assisted bicycle according to claim 1, wherein the controller is configured or programmed to display, in the time display area, information including a symbol as the information indicating that the remaining capacity of the built-in battery is insufficient.

5. The electrically power assisted bicycle according to claim 4, wherein the symbol is a hyphen.

6. The electrically power assisted bicycle according to claim 5, wherein
    the time display area includes a plurality of display areas each including seven segments, and displays time using the plurality of display areas; and
    the plurality of display areas each display any of numerals 0 through 9 by using the seven segments, and displays one hyphen by using one of the seven segments.

7. The electrically power assisted bicycle according to claim 1, wherein the controller is configured or programmed to display in a blinking mode the information indicating that the remaining capacity of the built-in battery is insufficient in the time display area.

8. The electrically power assisted bicycle according to claim 1, wherein the controller is configured or programmed to display, in the time display area for a predetermined time period, the information indicating that the remaining capacity of the built-in battery is insufficient, and then to turn off the display of the information indicating that the remaining capacity of the built-in battery is insufficient.

9. The electrically power assisted bicycle according to claim 1, wherein
- the controller is operated in a sleep mode when the electrically power assisted bicycle is turned off from the power-on state;
- the controller is configured or programmed to calculate time in the sleep mode; and
- the controller is configured or programmed to display time in the time display area when the electrically power assisted bicycle is turned on from the power-off state and the controller is activated from the sleep mode.

10. The electrically power assisted bicycle according to claim 9, wherein the controller is operated in the sleep mode using the electric power supplied from the built-in battery when the detachable battery is detached from the electrically power assisted bicycle.

11. The electrically power assisted bicycle according to claim 1, wherein
- the controller is shut down when the remaining capacity of the built-in battery becomes insufficient and the electrically power assisted bicycle is in the power-off state; and
- when the electrically power assisted bicycle is turned on from the power-off state in which the detachable battery is attached to the electrically power assisted bicycle, and then the controller is activated from the shut-down state, the controller is configured or programmed to display, in the time display area, the information indicating that the remaining capacity of the built-in battery is insufficient.

* * * * *